(12) United States Patent
Tsuboi et al.

(10) Patent No.: US 11,731,911 B2
(45) Date of Patent: Aug. 22, 2023

(54) POROUS MATERIAL, CELL STRUCTURE, AND METHOD OF PRODUCING POROUS MATERIAL

(71) Applicant: NGK INSULATORS, LTD., Nagoya (JP)

(72) Inventors: Mika Tsuboi, Nagoya (JP); Yunie Izumi, Nagoya (JP); Takahiro Tomita, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 16/357,871

(22) Filed: Mar. 19, 2019

(65) Prior Publication Data

US 2019/0292108 A1 Sep. 26, 2019

(30) Foreign Application Priority Data

Mar. 26, 2018 (JP) .................................. 2018-057355

(51) Int. Cl.
*C04B 38/00* (2006.01)
*C04B 35/565* (2006.01)
(Continued)

(52) U.S. Cl.
CPC ...... *C04B 38/0006* (2013.01); *B01D 46/2418* (2013.01); *B01D 53/9431* (2013.01); *B01J 21/08* (2013.01); *B01J 23/02* (2013.01); *B01J 23/72* (2013.01); *B01J 23/78* (2013.01); *B01J 27/224* (2013.01); *B01J 35/04* (2013.01); *B01J 37/0018* (2013.01); *B01J 37/08* (2013.01); *B01J 37/12* (2013.01); *B28B 11/243* (2013.01); *C04B 35/565* (2013.01); *C04B 38/0635* (2013.01); *B01D 2255/9155* (2013.01);
(Continued)

(58) Field of Classification Search
CPC .......................... C04B 38/0006; C04B 35/565
See application file for complete search history.

(56) References Cited

U.S. PATENT DOCUMENTS 4,024,171 A * 5/1977 McArthur ................ B01J 21/02
518/715
4,957,554 A * 9/1990 Mathers ................ C04B 35/195
106/35
(Continued)

FOREIGN PATENT DOCUMENTS

JP 5922629 B2 5/2016
JP 6043340 B2 12/2016
(Continued)

OTHER PUBLICATIONS

Japanese Office Action (with English translation), Japanese Application No. 2018-057355, dated Sep. 13, 2021 (8 pages).

*Primary Examiner* — Mark Ruthkosky
*Assistant Examiner* — Julia L Rummel
(74) *Attorney, Agent, or Firm* — Burr Patent Law, PLLC

(57) ABSTRACT

A porous material includes aggregate particles and a binding material. In the aggregate particles, oxide films containing cristobalite are provided on surfaces of particle bodies that are silicon carbide particles or silicon nitride particles. The binding material binds the aggregate particles together in a state where pores are provided therein. The porous material contains at least one of copper, calcium, and nickel as an ancillary component.

6 Claims, 3 Drawing Sheets

(51) Int. Cl.
*C04B 38/06* (2006.01)
*B01J 27/224* (2006.01)
*B01J 21/08* (2006.01)
*B01J 23/78* (2006.01)
*B01J 23/72* (2006.01)
*B01J 23/02* (2006.01)
*B01J 35/04* (2006.01)
*B01J 37/00* (2006.01)
*B01J 37/08* (2006.01)
*B01J 37/12* (2006.01)
*B01D 46/24* (2006.01)
*B01D 53/94* (2006.01)
*B28B 11/24* (2006.01)

(52) U.S. Cl.
CPC .. *B01D 2279/30* (2013.01); *C04B 2235/3206* (2013.01); *C04B 2235/3208* (2013.01); *C04B 2235/3213* (2013.01); *C04B 2235/3217* (2013.01); *C04B 2235/3229* (2013.01); *C04B 2235/3281* (2013.01); *C04B 2235/3418* (2013.01); *C04B 2235/3481* (2013.01); *C04B 2235/3826* (2013.01); *C04B 2235/656* (2013.01)

(56) References Cited

U.S. PATENT DOCUMENTS

| | | | |
|---|---|---|---|
| 6,391,813 B1* | 5/2002 | Merkel | C04B 35/195 501/119 |
| 2006/0003889 A1* | 1/2006 | Furukawa | B01J 23/58 502/178 |
| 2014/0290195 A1 | 10/2014 | Izumi et al. | |
| 2014/0370232 A1* | 12/2014 | Izumi | C04B 38/0006 428/116 |
| 2014/0378297 A1 | 12/2014 | Tomita et al. | |
| 2015/0093540 A1* | 4/2015 | Ichikawa | C04B 35/573 428/117 |
| 2015/0259254 A1* | 9/2015 | Ichikawa | C04B 35/565 428/116 |
| 2017/0282108 A1 | 10/2017 | Mizuno et al. | |
| 2017/0348676 A1* | 12/2017 | Coupland | B01J 29/06 |

FOREIGN PATENT DOCUMENTS

| | | |
|---|---|---|
| JP | 6125869 B2 | 5/2017 |
| JP | 2017-178721 A | 10/2017 |
| WO | 2013/147321 A1 | 10/2013 |

\* cited by examiner

POROUS MATERIAL, CELL STRUCTURE, AND METHOD OF PRODUCING POROUS MATERIAL

BACKGROUND OF THE INVENTION

1. Field of the Invention

The present invention relates to a porous material, a cell structure, and a method of producing a porous material.

2. Description of Related Art

Porous materials produced by binding aggregate particles such as silicon carbide particles together with a binding material that contains cordierite have excellent properties such as high thermal shock resistance. For example, Japanese Patent No. 5,922,629 discloses a porous material characterized in that its binding material contains crystalline cordierite and cerium or zirconium elements and that the mass ratio of the binding material to the total mass of the aggregate and the binding material falls within a predetermined range. Such a porous material is molded into a honeycomb structure whose interior is partitioned into a plurality of cells by partition walls, and is used in, for example, a catalyst carrier or a diesel particulate filter (DPF).

Incidentally, the honeycomb structure is exposed to high-temperature exhaust gas, and therefore it is preferable that oxide films are provided on surfaces of the aggregate particles by oxidation treatment in order to improve oxidation resistance. In this case, if the aggregate particles are silicon carbide particles or silicon nitride particles, the oxide films will contain cristobalite. On the other hand, in the case where a selective catalytic reduction (SCR) catalyst such as zeolite is to be supported by the honeycomb structure, the honeycomb structure is heated to a temperature of 200 to 400° C. in the process of drying slurry that contains the catalyst. At this time, the porous material with the oxide films provided therein has a high thermal expansion coefficient due to phase transition of the cristobalite, and therefore complicated control such as temperature condition control is necessary in order to appropriately support the catalyst. Also, if the thickness of the oxide films is further increased in order to further improve oxidation resistance, it can be thought that the amount of the cristobalite will increase and the thermal expansion coefficient will become higher. Accordingly, there is demand for the ability to reduce the thermal expansion coefficient of the porous material having improved oxidation resistance.

SUMMARY OF THE INVENTION

The present invention is directed to a porous material, and it is an object of the present invention to reduce the thermal expansion coefficient of the porous material having improved oxidation resistance.

The porous material according to the present invention includes aggregate particles in which oxide films containing cristobalite are provided on surfaces of particle bodies that are silicon carbide particles or silicon nitride particles, and a binding material that binds the aggregate particles together in a state where pores are provided therein. At least one of copper, calcium, and nickel is contained as an ancillary component.

According to the present invention, it is possible to reduce the thermal expansion coefficient of the porous material having improved oxidation resistance.

In a preferable embodiment of the present invention, a mass ratio of the ancillary component to a whole of the porous material is in a range of 0.4 to 3.0 mass % in terms of oxides.

In another preferable embodiment of the present invention, the oxide films have a thickness of 0.3 to 5.0 µm.

In another preferable embodiment of the present invention, the binding material contains cordierite.

In a preferable porous material, a thermal expansion coefficient at 250° C. with reference to 40° C. is lower than or equal to 6.0 ppm/K.

The present invention is also directed to a cell structure. The cell structure according to the present invention is made of the above-described porous material, and its interior is partitioned into a plurality of cells by partition walls.

The present invention is also directed to a method of producing a porous material. One method of producing a porous material according to the present invention includes a) obtaining a compact by molding a mixture of an aggregate raw material, a raw material for a binding material, and a pore-forming material, b) obtaining a fired compact by firing the compact in an inert atmosphere, and c) obtaining a porous material by subjecting the fired compact to an oxidation treatment in an oxidizing atmosphere. The aggregate raw material contains silicon carbide particles or silicon nitride particles, and the raw material for a binding material contains an ancillary component that is at least one of copper, calcium, and nickel.

Another method of producing a porous material according to the present invention includes a) obtaining a compact by molding a mixture of an aggregate raw material, a raw material for a binding material, and a pore-forming material, b) obtaining a fired compact by firing the compact in an inert atmosphere, and c) obtaining a porous material by subjecting the fired compact to an oxidation treatment in an oxidizing atmosphere. The aggregate raw material contains silicon carbide particles or silicon nitride particles, and the raw material for a binding material contains either strontium or an ancillary component that is at least one of copper, calcium, and nickel, and further contains aluminum hydroxide.

In this case, the mass ratio of the aluminum hydroxide to a whole of the raw material for a binding material is preferably in a range of 1 to 30 mass %.

In one aspect of the present invention, the oxidation treatment in the operation c) is performed at a temperature of 1100 to 1300° C.

These and other objects, features, aspects and advantages of the present invention will become more apparent from the following detailed description of the present invention when taken in conjunction with the accompanying drawings.

DETAILED DESCRIPTION OF THE INVENTION

Honeycomb Structure

Figure 1:
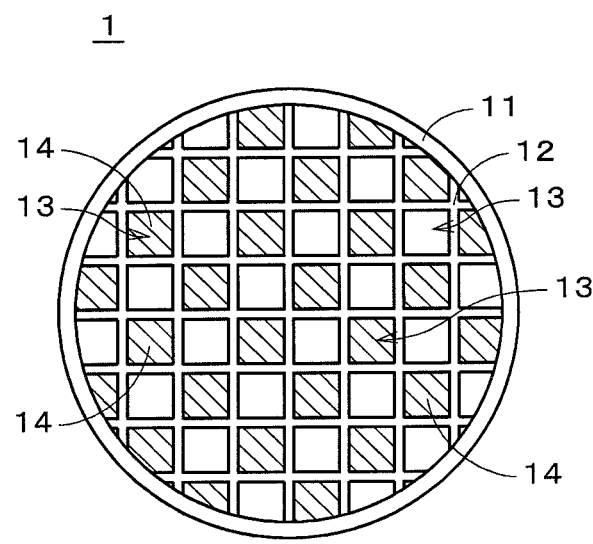
FIG. 1 illustrates a honeycomb structure.
Figure 2:
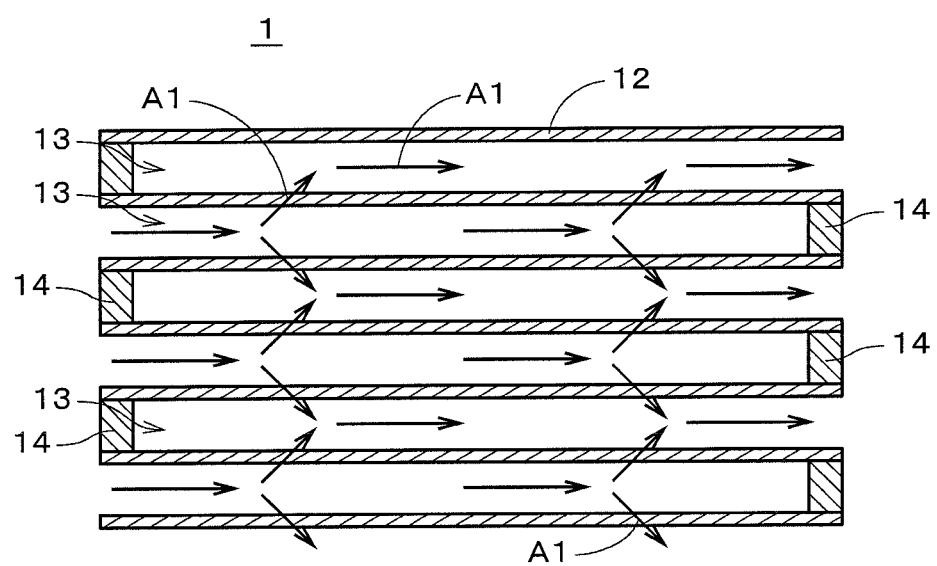
FIG. 2 is a sectional view of the honeycomb structure.

FIG. 1 illustrates a honeycomb structure 1 according to an embodiment of the present invention in simplified form. The honeycomb structure 1 is a tubular member that is long in one direction, and FIG. 1 illustrates the end face on one side in the longitudinal direction of the honeycomb structure 1. FIG. 2 is a sectional view of the honeycomb structure 1 and illustrates part of a section extending in the longitudinal direction. The honeycomb structure 1 is used in, for example, a filter such as a DPF. The honeycomb structure 1 may also be used in different applications other than filters.

The honeycomb structure 1 includes a tubular outer wall 11 and partition walls 12. The tubular outer wall 11 and the partition walls 12 are made of a porous material, which will be described later. The tubular outer wall 11 has a tubular shape extending in the longitudinal direction. A cross-sectional shape of the tubular outer wall 11 perpendicular to the longitudinal direction is, for example, circular, or may be polygonal or any other shape. The partition walls 12 are provided in the interior of the tubular outer wall 11 and partition the interior into a plurality of cells 13. The thickness of the partition walls 12 is, for example, greater than or equal to 30 micrometers (μm) and preferably greater than or equal to 50 μm. The thickness of the partition walls 12 is, for example, less than or equal to 1000 μm, preferably less than or equal to 500 μm, and more preferably less than or equal to 350 μm.

Each cell 13 is a space extending in the longitudinal direction. A cross-sectional shape of the cells 13 perpendicular to the longitudinal direction is, for example, polygonal (e.g., triangular, quadrangular, pentagonal, or hexagonal), or may be circular or any other shape. The plurality of cells 13 typically has the same cross-sectional shape. Alternatively, the plurality of cells 13 may include cells 13 having different cross-sectional shapes. The density of the cells is, for example, higher than or equal to 10 cells per square centimeters (cells/cm$^2$), preferably higher than or equal to 20 cells/cm$^2$, and more preferably higher than or equal to 50 cells/cm$^2$. The density of the cells is, for example, lower than or equal to 200 cells/cm$^2$ and preferably lower than or equal to 150 cells/cm$^2$. The honeycomb structure 1 is a cell structure whose interior is partitioned into the plurality of cells 13 by the partition walls 12.

In the case where the honeycomb structure 1 is used as a DPF, a predetermined gas flows, using one end in the longitudinal direction of the honeycomb structure 1 as an inlet and the other end as an outlet. A predetermined number of cells 13 are each provided with a sealer 14 at its end on the inlet side, and the remaining cells 13 are each provided with a sealer 14 at its end on the outlet side. Therefore, the gas flowing into the honeycomb structure 1 travels from the cells 13 whose inlet side is not sealed to the cells 13 whose outlet side is not sealed through the partition walls 12 (see arrows A1 in FIG. 2). At this time, particulate substances in the gas are collected efficiently by the partition walls 12. At each end on the inlet and outlet sides of the honeycomb structure 1, it is preferable that the sealers 14 are alternately provided in the direction of arrangement of the cells 13. In the honeycomb structure 1, a catalyst is supported as necessary.

Porous Material

Figure 3:
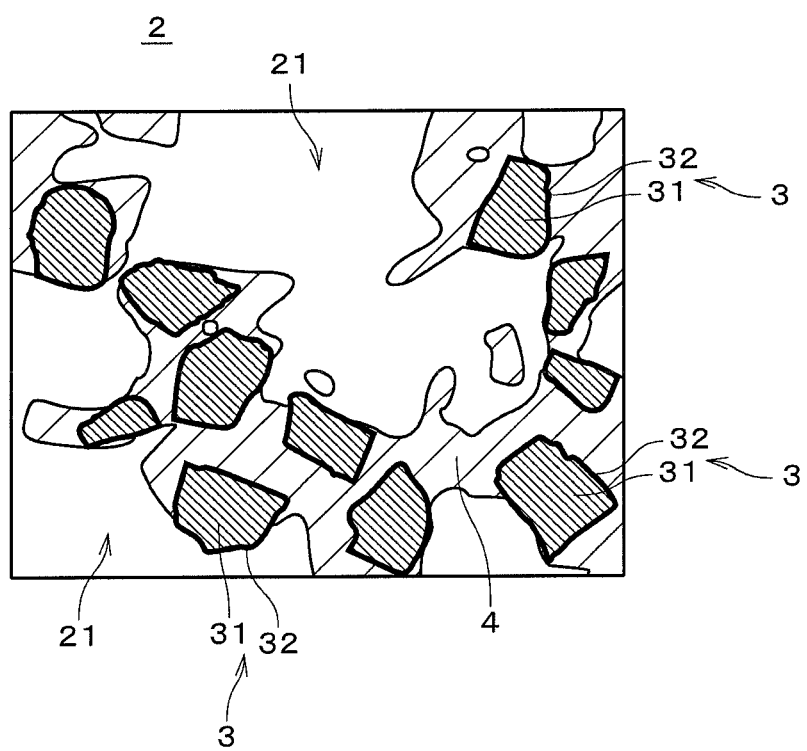
FIG. 3 illustrates a structure of a porous material.

FIG. 3 illustrates a structure of a porous material 2 that forms the honeycomb structure 1. The porous material 2 is a porous sintered compact and includes aggregate particles 3 and a binding material 4. The binding material 4 binds the aggregate particles 3 together in a state where pores 21 are provided therein. The binding material 4 contains, for example, crystalline cordierite. In the porous material 2, substances other than the aggregate particles 3 are in principle assumed to be included in the binding material 4.

Each aggregate particle 3 includes a particle body 31. The particle bodies 31 are silicon carbide (SiC) particles or silicon nitride ($Si_3N_4$) particles. The porous material 2 may contain both particle bodies 31 of silicon carbide particles and particle bodies 31 of silicon nitride particles. In the present embodiment, the particle bodies 31 are silicon carbide particles. The particle bodies 31 of the aggregate particles 3 are typically particles of a substance that is the largest in amount among substances that form the porous material 2. The aggregate particles 3 further include oxide films 32 that are provided on surfaces of the particle bodies 31. In FIG. 3, the oxide films 32 are indicated by thick lines. Preferably, each aggregate particle 3 consists of a particle body 31 and an oxide film 32. The oxide films 32 are oxide layers that are formed on the surfaces of the particle bodies 31 made of non-oxide by heat treatment performed in an oxidizing atmosphere. The oxide films 32 contain cristobalite. The porous material 2 can obtain excellent oxidation resistance by providing the oxide films 32 around the particle bodies 31.

Figure 4:
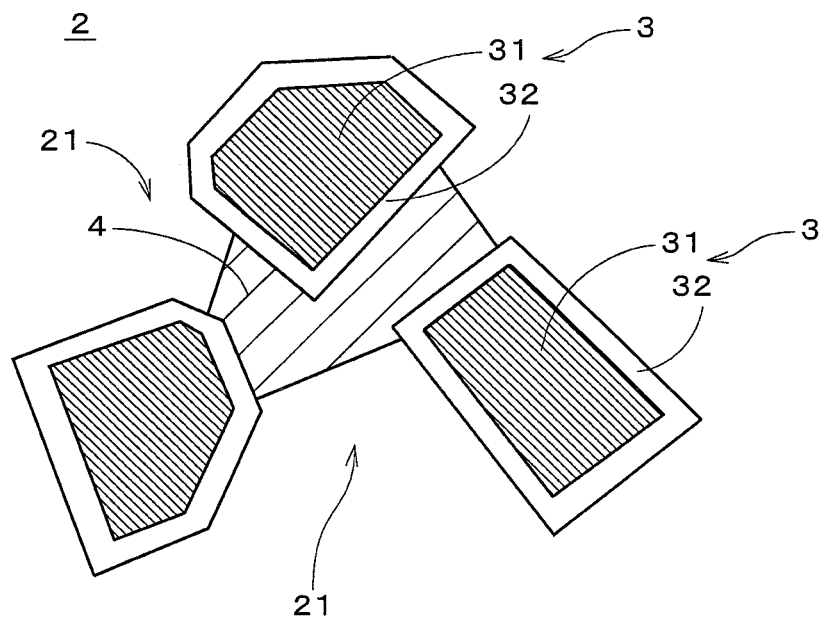
FIG. 4 is a diagram for describing oxide films of the porous material.

FIG. 4 is a diagram for describing the oxide films 32 of the porous material 2. FIG. 4 schematically illustrates the particle bodies 31, the oxide films 32, and the binding material 4. In the porous material 2, the oxide films 32 exist both between the particle bodies 31 and the binding material 4 and between the particle bodies 31 and the pores 21. In order to more reliably improve the oxidation resistance of the porous material 2, the thickness (average thickness) of the oxide films 32 is, for example, greater than or equal to 0.3 μm, preferably greater than or equal to 0.5 μm, and more preferably greater than or equal to 0.8 μm.

Although it is possible to reduce the thermal expansion coefficient of the porous material 2 as will be described later, it can be thought that the thermal expansion coefficient will increase as the thickness of the oxide films 32 increases. Therefore, in order to further reduce the thermal expansion coefficient, the thickness of the oxide films 32 is, for example, less than or equal to 5.0 μm, preferably less than or equal to 3.5 μm, and more preferably less than or equal to 2.0 μm. In the measurement of the thickness of the oxide films 32, for example, a section obtained by mirror polishing the porous material 2 is observed under a predetermined magnification. Then, the length from the interface between each oxide film 32 and a pore 21 to the interface between the oxide film 32 and the particle body 31 is obtained at a plurality of positions, and a mean value of these lengths is obtained as the thickness of the oxide films 32.

In the porous material 2, the mass ratio of the aggregate particles 3 to the whole of the porous material 2 is higher than 50 mass %. That is, the mass ratio of the binding material 4 to the whole of the porous material 2 is lower than 50 mass %. Also, the binding material 4 contains 50 mass % or more of cordierite to the whole of the binding material 4. That is, it is preferable that the binding material 4 is composed primarily of cordierite. The cordierite is formed of a silicon dioxide ($SiO_2$) component, a magnesium oxide (MgO) component, and an aluminum oxide ($Al_2O_3$) component.

The mass ratio of the cordierite to the whole of the porous material 2 is, for example, higher than or equal to 10 mass % and preferably higher than or equal to 12 mass %. This allows the porous material 2 to ensure a certain level of mechanical strength (here, bending strength). Although the porous material 2 is required to have a high porosity as will be described later, an excessive increase in the amount of the binding material 4 will increase the difficulty of achieving a high porosity of the porous material 2. In order to easily achieve a high porosity of the porous material 2, the mass ratio of the cordierite, which is the major component of the binding material 4, to the whole of the porous material 2 is, for example, lower than or equal to 40 mass % and preferably lower than or equal to 30 mass %.

The mass ratios of crystalline phases of components (e.g., SiC, cristobalite, and cordierite) in the porous material 2 are, for example, obtained in the way described below. First, an X-ray diffraction pattern of the porous material 2 is obtained using an X-ray diffractometer. A multi-function X-ray powder diffractometer (D8 ADVANCE by Bruker Corporation) is used as the X-ray diffractometer. Conditions for X-ray diffractometry include a CuKα-ray source, 10 kV, 20 mA, and 2θ=5 to 100°. Then, obtained X-ray diffraction data is analyzed by the Rietveld method using analysis software TOPAS (by Bruker AXS) to quantitatively determine each crystalline phase. The mass ratio of each crystalline phase of the components is calculated assuming that the sum of the masses of all detected crystalline phases is 100 mass %.

The porous material 2 contains an ancillary component that is at least one of copper (Cu), calcium (Ca), and nickel (Ni). The ancillary component is at least one selected from the group consisting of copper, calcium, and nickel. The ancillary component may be contained in the oxide films 32 of the aggregate particles 3, or may be contained in the binding material 4.

Incidentally, the cristobalite contained in the oxide films 32 undergoes sudden volume changes due to its phase transition from the α phase to the β phase at temperatures close to 200° C. Accordingly, porous materials containing cristobalite tend to have high thermal expansion coefficients in a temperature range that includes temperatures close to 200° C. In contrast, the porous material 2 that contains the above-described ancillary component can suppress an increase in its thermal expansion coefficient, irrespective of the presence of the cristobalite. As a result, it is possible to improve the thermal shock resistance of the porous material 2. Although the reason why the presence of the ancillary component reduces the thermal expansion coefficient is unclear, one conceivable reason is that the ancillary component forms a solid solution with part of the cristobalite, thereby stabilizing the crystal structure of the cristobalite and preventing the phase transition of the cristobalite. Another conceivable possibility is that part of the cristobalite exists as a different crystalline phase due to the presence of the ancillary component.

In the case where the ancillary component contains copper or nickel, in order to more reliably reduce the thermal expansion coefficient of the porous material 2, the mass ratio of the ancillary component to the whole of the porous material 2 is, for example, higher than or equal to 0.2 mass %, preferably higher than or equal to 0.3 mass %, and more preferably higher than or equal to 0.4 mass % in terms of oxides. In the case where the ancillary component contains only calcium, the mass ratio of the ancillary component is, for example, higher than or equal to 0.4 mass % and preferably higher than or equal to 0.5 mass %. When the ancillary component of the porous material 2 contains calcium, the mechanical strength of the porous material 2 will increase, and therefore it is possible to further improve thermal shock resistance in combination with the reduction in thermal expansion coefficient.

The mass ratio of the ancillary component is preferably lower than that of any of the silicon dioxide component, the magnesium oxide component, and the aluminum oxide component that form the cordierite. The mass ratio of the ancillary component is, for example, lower than or equal to 3.0 mass %, preferably lower than or equal to 2.0 mass %, and more preferably lower than or equal to 1.5 mass %. In the case where the ancillary component contains multiple types of elements, the aforementioned mass ratio is a total mass ratio of these multiple types of elements. The mass ratio of each component contained in the porous material 2 is obtained by, for example, inductivity coupled plasma (ICP) spectroscopy.

In a preferable porous material 2, the rate of expansion of the length thereof during heating from 40° C. to 250° C., i.e., a thermal expansion coefficient at 250° C. with reference to 40° C. (hereinafter, referred to as the "thermal expansion coefficient at temperatures of 40 to 250° C."), is lower than or equal to 6.0 ppm/K (i.e., $6.0 \times 10^{-6}$/K). In a more preferable porous material 2, this thermal expansion coefficient is lower than or equal to 5.5 ppm/K. The thermal expansion coefficient is preferably kept as low as possible, and the lower limit value of the thermal expansion coefficient is, for example, 1.0 ppm/K. The thermal expansion coefficient is, for example, a value obtained by cutting out a test specimen with dimensions of 3 cells high×3 cells wide×20 mm long from the honeycomb structure 1 and measuring a mean coefficient of linear thermal expansion at temperatures of 40 to 250° C. in a direction parallel to the flow paths in the honeycomb structure 1 by a method compliant with JIS R1618.

In the case where an SCR catalyst such as zeolite is to be supported by the honeycomb structure 1, the honeycomb structure 1 is heated to a temperature close to 200° C. in the process of drying slurry that contains the catalyst. The honeycomb structure 1 (porous material 2) having a low thermal expansion coefficient at temperatures of 40 to 250° C. can appropriately support the SCR catalyst.

The porous material 2 used in the honeycomb structure 1 is required to have a high porosity (here, high open porosity). In order to easily achieve a high porosity of the porous material 2, the mean particle diameter of the aggregate particles 3 is preferably greater than or equal to 5 μm and more preferably greater than or equal to 10 μm. In order to avoid the porous material 2 from having a large number of excessively large pores 21, the mean particle diameter of the aggregate particles 3 is preferably less than or equal to 100 μm and more preferably less than or equal to 40 μm.

The porosity of the porous material 2 is, for example, higher than or equal to 40%. This suppresses an excessive increase in pressure loss in the honeycomb structure 1, which is used as a DPF. This also allows the honeycomb structure 1 to support a large amount of catalyst. In order to further reduce pressure loss and to support a larger amount of catalyst, the porosity is preferably higher than or equal to 50% and more preferably higher than or equal to 55%. Also, the porosity is, for example, lower than or equal to 80%. This allows the honeycomb structure 1 to ensure a certain level of mechanical strength. In order to further increase the mechanical strength, the porosity is preferably lower than or equal to 75% and more preferably lower than or equal to 70%. The open porosity can be measured by, for example, Archimedes method using deionized water as a medium. Note that the porosity can be adjusted by, for example, changing the amount of the pore-forming material, the amount of a sintering agent, or a firing atmosphere in the process of producing the porous material. The porosity can also be adjusted by changing the ratio between an aggregate raw material and a raw material for the binding material, which will be described later.

The mean pore diameter of the porous material 2 is preferably greater than or equal to 10 µm and more preferably greater than or equal to 15 µm. Also, the mean pore diameter is preferably less than or equal to 40 µm and more preferably less than or equal to 30 µm. If the mean pore diameter is less than 10 µm, pressure loss may increase. If the mean pore diameter exceeds 40 µm, when the porous material 2 is used in a DPF or other such devices, particulate substances in exhaust gas may not be collected partially and pass through the DPF or other such devices. The mean pore diameter is measured by mercury intrusion porosimetry (in accordance with JIS R1655).

Moreover, pores with pore diameters less than 10 µm preferably make up 20% or less of the total number of pores, and pores with pore diameters greater than 40 µm preferably make up 10% or less of the total number of pores. The pores with pore diameters less than 10 µm are likely to be clogged when the catalyst is supported, and therefore if the pores with pore diameters less than 10 µm make up more than 20% of the total number of pores, pressure loss may increase. The pores with pore diameters greater than 40 µm are likely to pass particulate substances therethrough, and therefore if the pores with pore diameters greater than 40 µm make up more than 10% of the total number of pores, a filtering function may deteriorate.

The bending strength of the porous material 2 is, for example, higher than or equal to 5.0 mega pascals (MPa). This further improves the thermal shock resistance of the porous material 2. The bending strength of the porous material 2 is preferably higher than or equal to 6.0 MPa and more preferably higher than or equal to 7.0 MPa. The upper limit of the bending strength of the porous material 2 is assumed to be approximately 40 MPa. The bending strength can be measured by a bending test compliant with JIS R1601.

In the case of using the porous material 2 (honeycomb structure 1) that supports an SCR catalyst such as zeolite, if the porous material 2 contains an alkali metal component such as sodium, $NO_x$ purification performance is known to degrade due to high-temperature aging (heat treatment). Therefore, in order to suppress the aforementioned degradation in $NO_x$ purification performance due to aging, the mass ratio of the alkali metal component to the whole of the porous material 2 is preferably made less than 0.1 mass % and more preferably less than or equal to 0.03 mass %. The mass ratio of the alkali metal component can be measured by ICP spectroscopy.

Method of Producing Porous Material

Figure 5:
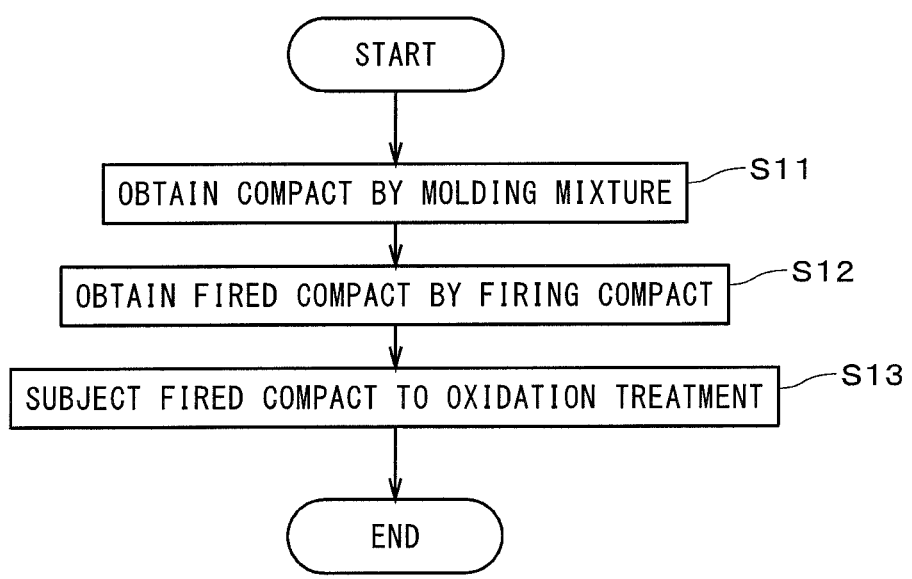
FIG. 5 illustrates a flow of processing for producing the porous material.

FIG. 5 illustrates a flow of processing for producing the porous material 2. Here, the honeycomb structure 1 is produced in the production of the porous material 2. That is, the porous material 2 is produced as the honeycomb structure 1.

First, an aggregate raw material for the aggregate particles 3, a raw material for the binding material for generation of the binding material 4 by firing, and a pore-forming material are mixed, and other materials such as a binder, a surface-active agent, or water are added as necessary to prepare a molding raw material. The aggregate raw material contains silicon carbide particles or silicon nitride particles. The mean particle diameter of the aggregate raw material is preferably greater than or equal to 5 µm and more preferably greater than or equal to 10 µm. The mean particle diameter of the aggregate raw material is preferably less than or equal to 100 µm and more preferably less than or equal to 40 µm.

If the aggregate raw material in the molding raw material is assumed to be 100 mass %, the ratio of the raw material for the binding material is, for example, higher than or equal to 9.0 mass % and less than or equal to 67.0 mass %. The raw material for the binding material contains, for example, a cordierite raw material. The cordierite raw material means a raw material for generation of cordierite crystals by firing. The cordierite raw material contains an aluminum oxide component, a silicon dioxide component, and a magnesium oxide component. The aluminum oxide component includes not only aluminum oxide, but also aluminum and oxygen that make up the composition ratio of aluminum oxide in a raw material that contains aluminum and oxygen. The silicon dioxide component includes not only silicon dioxide, but also silicon and oxygen that make up the composition ratio of silicon dioxide in a raw material that contains silicon and oxygen. The magnesium oxide component includes not only magnesium oxide, but also magnesium and oxygen that make up the composition ratio of magnesium oxide in a raw material that contains magnesium and oxygen.

The raw material for the binding material further contains at least one of copper, calcium, and nickel as an ancillary component. The ancillary component uses, for example, an oxide or carbonate that contains the ancillary component as its raw material, and is contained in the raw material for the binding material. The raw material for the ancillary component is, for example, copper oxide (CuO) or calcium carbonate ($CaCO_3$). The mass ratio of the raw material for the ancillary component to the whole of the raw material for the binding material is, for example, higher than or equal to 0.5 mass % and preferably higher than or equal to 1.0 mass %. The mass ratio of the raw material for the ancillary component is, for example, lower than or equal to 10.0 mass % and preferably lower than or equal to 8.0 mass %. Although, as described previously, the ancillary component of the porous material 2 is not intended to be always contained in only the binding material 4, the raw material for the ancillary component is treated as part of the raw material for the binding material in the production of the porous material 2.

The raw material for the binding material preferably further contains aluminum hydroxide ($Al(OH)_3$). Co-doping of the aluminum hydroxide in the raw material for the binding material can further reduce the thermal expansion coefficient of the porous material 2 to be produced. In order to more reliably reduce the thermal expansion coefficient, the mass ratio of the aluminum hydroxide to the whole of the raw material for the binding material is, for example, higher than or equal to 1 mass % and preferably higher than or equal to 3 mass %. The mass ratio of the aluminum hydroxide is, for example, lower than or equal to 30 mass % and preferably lower than or equal to 25 mass %. In the case where the raw material for the binding material contains the aluminum hydroxide, use of strontium, instead of the ancillary component, can also reduce the thermal expansion coefficient of the porous material to be produced. The raw material containing strontium is, for example, strontium carbonate ($SrCO_3$) or strontium oxide (SrO). A preferable mass ratio of the raw material for strontium is the same as that of the raw material for the ancillary component. As described above, in order to produce a porous material having a low thermal expansion coefficient, it is preferable that the raw material for the binding material contains either strontium or an ancillary component that is at least one of copper, calcium, and nickel and further contains aluminum hydroxide. The raw material for the binding material may further contain other components such as cerium dioxide ($CeO_2$).

Examples of the binder include organic binders such as methylcellulose, hydroxypropyl methylcellulose, hydroxyethyl cellulose, carboxymethyl cellulose, and polyvinyl alcohol. The binder content is preferably in the range of 2 to 10 mass % to the whole of the molding raw material.

As the surface-active agent, ethylene glycol, dextrin, fatty acid soap, or polyalcohol can be used, for example. These may be used singly, or two or more of them may be used in combination. The surface-active agent content is preferably lower than or equal to 2 mass % to the whole of the molding raw material.

The pore-forming material is not particularly limited as long as it makes pores after firing, and examples thereof include graphite, starch, foam resins, absorbent polymers, and silica gel. The pore-forming material content is preferably lower than or equal to 40 mass % to the whole of the molding raw material. The mean particle diameter of the pore-forming material is preferably greater than or equal to 10 μm. Also, the mean particle diameter of the pore-forming material is preferably less than or equal to 70 μm. If the mean particle diameter of the pore-forming material is less than 10 μm, pores may not be formed satisfactorily. If the mean particle diameter of the pore-forming material is greater than 70 μm, for example when the porous material according to the present embodiment is used in a DPF or other such devices, particulate substances in exhaust gas may not be collected partially and pass through the DPF or other such devices. Note that in the case where the pore-forming material is an absorbent polymer, the mean particle diameter refers to a value obtained after water absorption. The water content is adjusted appropriately so as to make the hardness of kneaded clay easy to mold, but preferably, the water content is in the range of 20 to 80 mass % to the whole of the molding raw material.

Then, the molding raw material is kneaded into kneaded clay. A method of kneading the molding raw material into kneaded clay is not particularly limited, and one example thereof is using a device such as a kneader or a vacuum kneading machine. Thereafter, the kneaded clay is subjected to extrusion molding to form a honeycomb compact (compact). Note that the kneaded clay is also included in the concept of the molding raw material. The extrusion molding preferably uses a die having desired properties such as overall shape, cell shape, partition wall thickness, and cell density. The material for the die is preferably hard metal that is resistant to wear. The honeycomb compact is structured to include partition walls that partition the honeycomb compact into a plurality of cells serving as flow paths for fluid, and a tubular outer wall located on the outermost perimeter. The properties of the honeycomb compact such as partition wall thickness, cell density, and tubular outer wall thickness are appropriately determined in consideration of shrinkage during drying and firing and in accordance with the figure of the honeycomb structure to be produced. As described above, the compact is obtained by molding the mixture (molding raw material) of the aggregate raw material, the raw material for the binding material, and the pore-forming material (step S11).

The honeycomb compact is preferably dried before firing, which will be described later. A drying method is not particularly limited, and examples thereof include electromagnetic-wave heating methods such as drying by microwave heating and drying by high-frequency dielectric heating, and external heating methods such as hot air drying and superheated steam drying. From the viewpoint of being able to rapidly and uniformly dry the entire compact without causing cracking, it is preferable that among these methods, an electromagnetic-wave heating method is first used to dry a certain amount of moisture, and then an external heating method is used to dry the remaining moisture. In this case, in the honeycomb compact, for example, 30 to 99 mass % of moisture with respect to the amount of moisture before drying is removed from the honeycomb compact by the electromagnetic-wave heating method, and then the moisture is further reduced to 3 mass % or less by the external heating method. A preferable electromagnetic-wave heating method is drying by dielectric heating, and a preferable external heating method is hot air drying.

If the honeycomb compact does not have a desired length in the direction of extension of the cells, it is preferable that the honeycomb compact is cut to the desired length. A cutting method is not particularly limited, and one example thereof is using a device such as a circular saw cutter.

Then, the compact is fired to obtain a fired compact (step S12). Here, calcination is preferably performed before firing in order to remove the binder or other components. The calcination is performed in an ambient atmosphere, for example, at a temperature of 200 to 600° C. for 0.5 to 20 hours. The firing is performed in an inert atmosphere filled with inert gas such as nitrogen or argon (with an oxygen partial pressure of $10^{-4}$ atmospheres or less). The firing temperature is, for example, higher than or equal to 1300° C. In the present embodiment, by firing the compact, a binding material composed primarily of cordierite is generated, and the binding material binds the aggregate particles together in a state where pores are provided therein. The firing temperature is preferably higher than or equal to 1330° C. and more preferably higher than or equal to 1350° C. The firing temperature is, for example, lower than or equal to 1600° C. and preferably lower than or equal to 1500° C. The pressure during firing is preferably normal atmospheric pressure. The firing time is, for example, longer than or equal to one hour and shorter than or equal to 20 hours.

After the firing process, the fired compact is subjected to heat treatment (oxidation treatment) in an oxidizing atmosphere to obtain a porous material that is a honeycomb structure (step S13). The oxidizing atmosphere is, for example, an ambient atmosphere (which may contain water vapor). As described previously, the aggregate raw material contains silicon carbide particles or silicon nitride particles of non-oxide, and therefore oxide films are formed on surfaces of these particles by the oxidation treatment. Accordingly, the porous material can provide excellent oxidation resistance.

In order to properly form the oxide films, the oxidation treatment temperature is preferably higher than or equal to 1100° C. and more preferably higher than or equal to 1150° C. The oxidation treatment temperature is also preferably lower than or equal to 1300° C. and more preferably lower than or equal to 1270° C. The oxidation treatment time is, for example, longer than or equal to one hour and shorter than or equal to 20 hours. The thicknesses of the oxide films can be adjusted to some extent by changing conditions for the oxidation treatment. The calcination, the firing, and the oxidation treatment can be performed using, for example, an electric furnace or a gas furnace. The porous material produced by the above-described processing has a small dimensional change before and after firing, and therefore it is possible to improve dimensional accuracy and to improve productivity of the honeycomb structure.

EXAMPLES

Next, examples will be described. Here, porous materials (honeycomb structures) were produced as Examples 1 to 9 and Comparative Examples 1 and 2 under conditions given by Table 1.

TABLE 1

| | | Ratio of Aggregate Raw Material SiC/Mass % | Ratio of Raw Material for Binding Material Mass % | Composition of Raw Material for Binding Material | | | | | SrCO$_3$/ Mass % | Al(OH)$_3$/ Mass % | Total/ Mass % | Firing Temperature °C. | Firing Atmosphere | Oxidation Temperature °C. |
|---|---|---|---|---|---|---|---|---|---|---|---|---|---|---|
| | | | | MgO/ Mass % | SiO$_2$/ Mass % | Al$_2$O$_3$/ Mass % | CeO$_2$/ Mass % | CuO/ Mass % | CaCO$_3$/ Mass % | | | | | |
| Example | 1 | 75 | 25 | 9.7 | 45.9 | 39.8 | 2.8 | 1.9 | 0.0 | 0.0 | 0.0 | 100 | 1400 | Ar | 1250 |
| Example | 2 | | | 9.0 | 42.7 | 37.0 | 2.6 | 1.7 | | | 7.0 | 100 | | | |
| Example | 3 | | | 9.5 | 45.1 | 39.0 | 2.7 | 3.7 | | | 0.0 | 100 | | | 1210 |
| Example | 4 | | | 8.3 | 39.3 | 34.0 | 2.4 | 3.2 | | | 12.8 | 100 | | | |
| Example | 5 | | | 9.2 | 43.5 | 37.7 | 2.6 | 7.1 | | | 0.0 | 100 | | | 1170 |
| Example | 6 | | | 7.1 | 33.9 | 29.3 | 2.0 | 5.5 | | | 22.1 | 100 | | | |
| Example | 7 | | | 9.6 | 45.7 | 39.6 | 2.8 | 0.0 | 2.2 | | 0.0 | 100 | | | 1250 |
| Example | 8 | | | 9.3 | 44.3 | 38.3 | 2.7 | | 2.2 | | 3.2 | 100 | | | |
| Example | 9 | | | 10.2 | 36.3 | 39.9 | 3.0 | | 0.0 | 2.4 | 8.2 | 100 | | | 1210 |
| Comparative Example | 1 | 75 | 25 | 1.5 | 8.2 | 89.8 | 0.4 | 0.0 | 0.0 | 0.0 | 0.0 | 100 | 1370 | Ar | 1210 |
| Comparative Example | 2 | | | | | | | | | | | | | | Null |

Examples 1 to 9

First, powdered silicon carbide (SiC) serving as an aggregate raw material and a powdered raw material for the binding material were mixed to prepare base powder. The mass ratio of the aggregate raw material in the base powder and the mass ratio of the raw material for the binding material in the base powder (both of which are mass ratios to the whole of the base powder) are as given in the "Ratio of Aggregate Raw Material" and "Ratio of Raw Material for Binding Material" columns in Table 1. Also, the mass ratio of each material for the raw material for the binding material (mass ratio to the whole of the raw material for the binding material) is as given in the "Composition of Raw Material for Binding Material" column in Table 1.

Then, a pore-forming material, a binder, and water were added to the aforementioned base powder to obtain a molding raw material. Thereafter, the molding raw material was kneaded using a kneader to obtain plastic kneaded clay (molding raw material). The obtained kneaded clay was molded and processed into a circular cylinder shape (cylindrical shape) using a vacuum kneading machine, and the obtained circular cylindrical kneaded clay was put into an extruder to obtain a honeycomb-shaped honeycomb compact by extrusion molding. The honeycomb compact was then dried in two stages, i.e., first dried with microwaves and then dried using a hot air drier. After the honeycomb compact was adjusted to a desired length by cutting both ends thereof, the honeycomb compact was subjected to degreasing treatment (calcination treatment) in which the honeycomb compact was degreased at a predetermined temperature in an ambient atmosphere. Thereafter, the honeycomb compact was fired in an inert gas atmosphere (argon gas atmosphere) and then subjected to oxidation treatment in the atmosphere. The temperature during firing (firing temperature) and the temperature during oxidation treatment (oxidation temperature) are as given in Table 1. In this way, the porous materials having honeycomb structures (simply, honeycomb structures) of Examples 1 to 9 were obtained.

Comparative Examples 1 and 2

The porous materials according to Comparative Examples 1 and 2 were produced in the same manner as in Examples 1 to 9, except that the ancillary component (copper oxide (CuO) and calcium carbonate (CaCO$_3$) in Table 1) and aluminum hydroxide (Al(OH)$_3$) were not added to the molding raw material. Note that the oxidation treatment was not performed in Comparative Example 2.

Various Measurements of Porous Materials

For each produced porous material, the mass ratios of the components, namely, SiO$_2$, Al$_2$O$_3$, MgO, CeO$_2$, CuO, CaO, and SrO, were quantitatively determined by ICP spectroscopy. Table 2 shows the results of determination performed on the porous materials of Examples 1 to 9 and Comparative Examples 1 and 2.

TABLE 2

| | | Composition Ratio of Oxide to Whole | | | | | | |
|---|---|---|---|---|---|---|---|---|
| | | SiO$_2$/ Mass % | Al$_2$O$_3$/ Mass % | MgO/ Mass % | CeO$_2$/ Mass % | CuO/ Mass % | CaO/ Mass % | SrO/ Mass % |
| Example | 1 | 24.2 | 7.3 | 2.3 | 0.6 | 0.5 | 0.0 | 0.0 |
| Example | 2 | 23.8 | 8.1 | 2.3 | 0.6 | 0.4 | | |
| Example | 3 | 23.5 | 8.7 | 2.2 | 0.5 | 0.9 | | |
| Example | 4 | 23.2 | 9.5 | 2.2 | 0.6 | 0.7 | | |
| Example | 5 | 22.8 | 9.4 | 2.3 | 0.5 | 1.5 | | |
| Example | 6 | 22.3 | 10.6 | 2.3 | 0.6 | 1.2 | | |
| Example | 7 | 24.5 | 6.9 | 2.3 | 0.6 | 0.0 | 0.6 | |
| Example | 8 | 23.5 | 8.1 | 2.3 | 0.6 | | 0.6 | |
| Example | 9 | 19.3 | 12.5 | 2.5 | 0.7 | | 0.0 | 0.7 |
| Comparative Example | 1 | 21.3 | 2.3 | 9.3 | 0.7 | 0.0 | 0.0 | 0.0 |
| Comparative Example | 2 | 19.8 | 1.8 | 7.6 | 0.5 | | | |

Moreover, the presence or absence and thickness of the oxide films in the aggregate particles, an open porosity, a honeycomb bending strength, a bending strength, and a thermal expansion coefficient were measured. Table 3 shows the results of measurements performed on the porous materials of Examples 1 to 9 and Comparative Examples 1 and 2.

each position, the length from the interface between the oxide film and the pore to the interface between the oxide film and the particle body was measured. Then, a mean value of these lengths was assumed to be the thickness of the oxide films.

The open porosity was measured using a piece of plate that was cut out in dimensions of 20 mm×20 mm×0.3 mm

TABLE 3

| | | Presence or Absence of Oxide Films | Thickness of Oxide Films μm | Open Porosity % | Honeycomb Bending Strength MPa | Bending Strength MPa | Thermal Expansion Coefficient 40-250° C. ppm/K | Thermal Shock Resistance | Oxidation Resistance | Overall Evaluation |
|---|---|---|---|---|---|---|---|---|---|---|
| Example | 1 | Present | 1.1 | 68.5 | 4.0 | 9.9 | 4.9 | ◎ | ○ | ○ |
| Example | 2 | Present | 1.0 | 67.8 | 5.0 | 12.4 | 4.7 | ◎ | ○ | ○ |
| Example | 3 | Present | 1.0 | 67.1 | 3.2 | 8.0 | 6.0 | ○ | ○ | ○ |
| Example | 4 | Present | 1.2 | 67.0 | 2.9 | 7.3 | 5.1 | ◎ | ◎ | ◎ |
| Example | 5 | Present | 1.5 | 66.8 | 3.0 | 7.4 | 4.8 | ◎ | ◎ | ◎ |
| Example | 6 | Present | 1.4 | 65.9 | 3.3 | 8.2 | 5.3 | ◎ | ◎ | ◎ |
| Example | 7 | Present | 1.1 | 66.7 | 5.7 | 14.2 | 5.2 | ◎ | ○ | ○ |
| Example | 8 | Present | 1.0 | 67.0 | 5.6 | 14.1 | 5.0 | ◎ | ○ | ○ |
| Example | 9 | Present | 1.4 | 64.2 | 8.1 | 20.1 | 5.8 | ○ | ◎ | ○ |
| Comparative Example | 1 | Present | 1.0 | 67.0 | 4.0 | 10.0 | 6.5 | X | ○ | X |
| Comparative Example | 2 | Absent | Absent | 67.0 | 4.2 | 11.0 | 2.5 | ◎ | X | X |

In the determination of the presence or absence of oxide films (SiO$_2$ film) in the aggregate particles, a porous material covered with a resin was mirror polished with diamond slurry or other materials, and an obtained section (polished surface) was examined under a magnification of 1,500 times to observe the surroundings of particle bodies (SiC). In Table 3, the porous materials in which the presence of oxide films was confirmed are given as "Present," and the porous materials in which the presence of oxide films was not confirmed are given as "Absent." Note that in a separately conducted X-ray diffraction analysis, cristobalite was detected from the porous materials including the oxide films. This confirmed that the oxide films were cristobalite. In the X-ray diffraction analysis, cordierite was also detected from all the porous materials of Examples 1 to 9 and Comparative Examples 1 and 2.

In the measurement of the thickness of the oxide film, the aforementioned section was examined under a magnification of 750 times to observe the surroundings of the particle bodies. To be more specific, given 15 positions were selected from a field of view at a magnification of 750 times, and at from the porous material, by Archimedes method using deionized water as a medium. The porous materials of Examples 1 to 9 and Comparative Examples 1 and 2 had approximately the same open porosity. In the measurement of the honeycomb bending strength, a test specimen was cut out in dimensions of 3 cells high×5 cells wide×30 to 40 mm long from the honeycomb structure (porous material), and a four-point bending test was conducted in accordance with JIS R1601 on the test specimen in a direction perpendicular to the longitudinal direction of penetration of the cells.

In the measurement of the bending strength, the honeycomb structure was processed into a test specimen with dimensions of 0.3 mm high×4 mm width×40 mm long where the direction of penetration of the cells is the longitudinal direction, and a binding test compliant with JIS R1601 was conducted on the test specimen as in the measurement of the honeycomb bending strength. All the porous materials of Examples 1 to 9 and Comparative Examples 1 and 2 had bending strengths higher than or equal to a value that is required from the viewpoint of thermal shock resistance. In the measurement of the thermal expansion coefficient, a test specimen was cut out in dimensions of 3 cells high×3 cells wide×20 mm long from the honeycomb structure, and a mean coefficient of linear thermal expansion (thermal expansion coefficient) at temperatures of 40 to 250° C. in the direction parallel to the flow paths in the honeycomb structure was measured by a method compliant with JIS R1618.

Table 3 shows items of "Thermal Shock Resistance," "Oxidation Resistance," and "Overall Evaluation." In the evaluation of the thermal shock resistance, double circles indicate porous materials having thermal expansion coefficients lower than 5.5 ppm/K, open circles indicate porous materials having thermal expansion coefficients higher than or equal to 5.5 ppm/K and lower than 6.5 ppm/K, and crosses indicate porous materials having thermal expansion coefficients higher than or equal to 6.5 ppm/K. In the evaluation of the oxidation resistance, double circles indicate porous materials in which the thickness of the oxide films is greater than or equal to 1.2 µm, open circles indicate porous materials in which the thickness of the oxide films is less than 1.2 µm and greater than or equal to 1.0 µm, and crosses indicate porous materials in which the thickness of the oxide films is less than 1.0 µm. In the overall evaluation, double circles indicate porous materials whose evaluation results of thermal shock resistance and oxidation resistance are both indicated by double circles, crosses indicate porous materials one of whose evaluation results of thermal shock resistance and oxidation resistance is indicated by a cross, and open circles indicate the remaining porous materials.

As shown in Tables 1 and 3, the presence of the oxide films with thicknesses of 1.0 to 1.5 µm was confirmed for the porous materials of Examples 1 to 9 and Comparative Example 1 that had undergone oxidation treatment, and the presence of the oxide films was not confirmed for the porous material of Comparative Example 2 that had not undergone oxidation treatment. It can be said that the porous materials including the oxide films have improved oxidation resistance. As shown in Tables 2 and 3, the porous material of Comparative Example 1 that included the oxide films but did not contain the ancillary component (CuO and CaO) had a high thermal expansion coefficient. In contrast, the porous materials of Examples 1 to 8 that included the oxide films and contained the ancillary component had lower thermal expansion coefficients than the porous material of Comparative Example 1. Accordingly, it can be said that in the case where the oxidation resistance of the porous material is improved by forming the oxide films, the thermal expansion coefficient of the porous material will be reduced and the thermal shock resistance thereof will be improved by including the ancillary component in the porous material. Moreover, the thermal expansion coefficient of the porous material of Example 9 was also reduced, in which the raw material for the binding material used in production did not contain the ancillary component but contained strontium and further contained aluminum hydroxide. Although none of the porous materials of Examples 1 to 8 contains nickel as its ancillary component, nickel is divalent, as with copper, and has an ionic radius close to that of copper (in hexacoordination, $Cu^{2+}$ has an ionic radius of 0.73 angstroms (Å) and $Ni^{2+}$ has an ionic radius of 0.69 Å). Therefore, nickel also easily forms a solid solution with cristobalite, and it can be thought that a porous material containing nickel as its ancillary component will also have a low thermal expansion coefficient.

Variations

The porous material 2, the honeycomb structure 1, and the method of producing a porous material described above can be modified in various ways.

The porous material 2 may be formed in different forms other than the honeycomb structure 1, and may be used in various applications other than filters. Depending on the application of the porous material 2, the aggregate particles 3 may contain particles of multiple types of substances. The major component of the binding material 4 may be other than cordierite, and may be glass, for example.

The methods of producing the porous material 2 and the honeycomb structure 1 are not limited to the examples described above, and may be modified in various ways.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention. This application claims priority benefit under 35 U.S.C. Section 119 of Japanese Patent Application No. 2018-057355 filed in the Japan Patent Office on Mar. 26, 2018, the entire disclosure of which is incorporated herein by reference.

REFERENCE SIGNS LIST

1 Honeycomb structure
2 Porous material
3 Aggregate particle
4 Binding material
12 Partition wall
13 Cell
21 Pore
31 Particle body
32 Oxide film
S11 to S13 Step

The invention claimed is:

1. A porous material comprising:
   aggregate particles in which oxide films containing cristobalite are provided on surfaces of particle bodies that are silicon carbide particles; and
   a binding material comprising cordierite and $CeO_2$ that binds said aggregate particles together in a state where pores are provided therein,
   wherein a mass ratio of the aggregate particles to a whole of the porous material is higher than 50 mass %;
   wherein a mass ratio of $CeO_2$ to a whole of said porous material is in a range of 0.5 to 0.7 mass %; and
   wherein said porous material contains copper as an ancillary component, said ancillary component forms a solid solution with the cristobalite of said oxide films, a mass ratio of said ancillary component to a whole of said porous material is in a range of 0.4 to 1.5 mass % in terms of oxides.

2. The porous material according to claim 1, wherein said oxide films have a thickness of 0.3 to 5.0 µm.

3. The porous material according to claim 1, wherein a thermal expansion coefficient in a temperature range of 40° C. to 250° C. is lower than or equal to 6.0 ppm/K.

4. A cell structure made of the porous material according to claim 1 whose interior is partitioned into a plurality of cells by partition walls.

5. A method of producing a porous material, comprising:
   a) obtaining a compact by molding a mixture of an aggregate raw material, a raw material for a binding material, said binding material comprising cordierite and $CeO_2$, and a pore-forming material;

b) obtaining a fired compact by firing said compact in an inert atmosphere; and c) obtaining a porous material by subjecting said fired compact to an oxidation treatment in an oxidizing atmosphere, wherein said aggregate raw material contains silicon carbide particles as particle bodies, the mass ratio of said aggregate raw material particles to the whole of said porous material is higher than 50 mass %, said raw material for a binding material contains an ancillary component that is copper, oxide films containing cristobalite are provided on surfaces of said particle bodies in said porous material, said ancillary component forms a solid solution with the cristobalite of said oxide films, a mass ratio of said ancillary component to a whole of said porous material is in a range of 0.4 to 1.5 mass % in terms of oxide, and a mass ratio of $CeO_2$ to a whole of said porous material is in a range of 0.5 to 0.7 mass %.

6. The method of producing a porous material according to claim 5, wherein said oxidation treatment in said operation c) is performed at a temperature of 1100 to 1300° C.

\* \* \* \* \*